Patented May 12, 1942

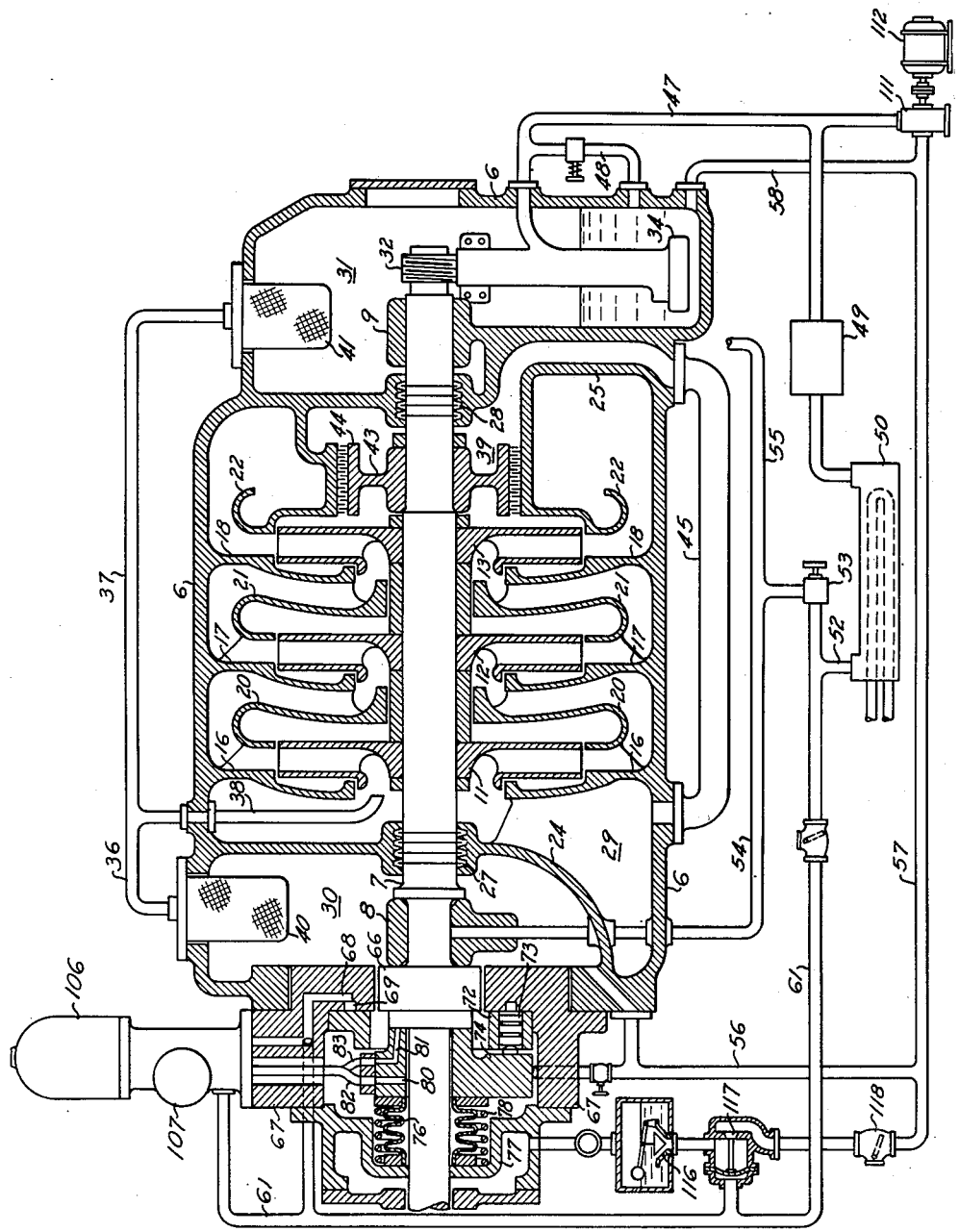

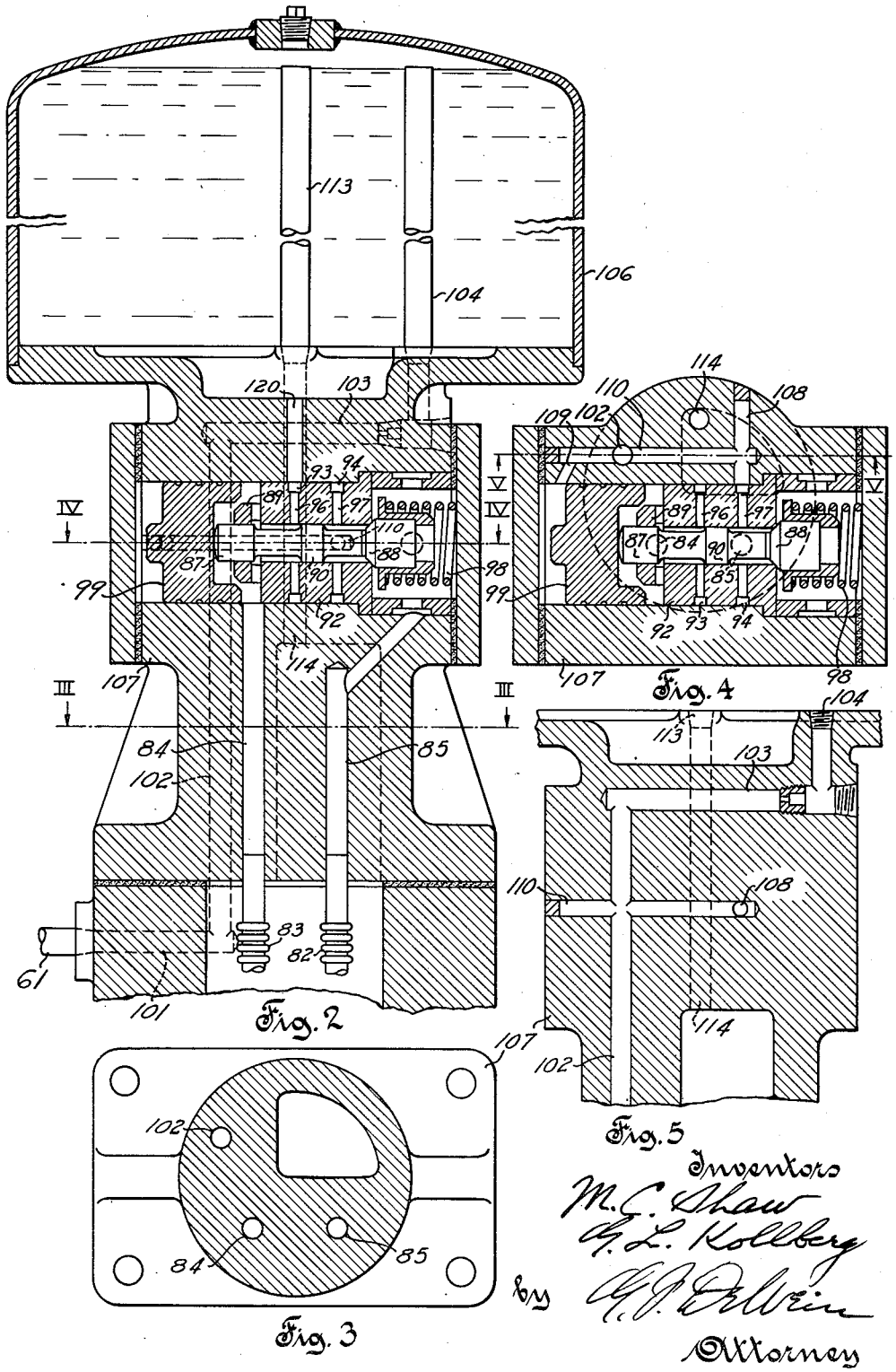

2,283,131

UNITED STATES PATENT OFFICE 2,283,131

CENTRIFUGAL BLOWER

Melvin C. Shaw, Wauwatosa, and Gustaf L. Kollberg, Milwaukee, Wis., assignors to Allis-Chalmers Manufacturing Company, Milwaukee, Wis., a corporation of Delaware Application July 17, 1940, Serial No. 345,902

3 Claims. (Cl. 230—132)

This invention relates to improvements in centrifugal compressors designed and used for the compression of a gas which must be kept uncontaminated by air and prevented from leaking out of the compressor.

When a centrifugal compressor is used for example in a compression-expansion type refrigerating system, the system must employ a gas having a large volume per ton of refrigeration required, a high specific weight and a low pressure-vaporization point. The compressor must be specially designed to operate on the gas employed and the gas must be kept uncontaminated by air to secure the operating conditions for which the compressor is actually designed. Such gases are also relatively expensive and means must be provided for preventing the leakage of gas out of the machine when the internal pressure is higher than the atmosphere. The various joints between the compressor parts and particularly the joint between the casing and shaft must therefore be sealed to prevent the leakage into or out of the machine of air or gas. Shafts of such machines rotate at relatively high speed and the machines are frequently shut down for relatively long periods of time. A seal between the casing and the shaft must therefore be effective both at the high operating speeds used and under widely varying conditions of pressure in the machine when the machine is at standstill. It is well known that leakage of fluid between two stationary parts can be prevented only when the parts are tightly and accurately in contact with each other. Such contacting is, however, difficult to maintain between relatively moving parts particularly at high speed and before an effective oil film has been established when starting up after shutdown. The shaft seal should accordingly be made with a set of sealing surfaces at a constant spacing from each for use during normal high speed operation of the machine and a separate set of sealing surfaces for movement into contact with each other when the machine is at standstill. A liquid must be supplied to the space between the surfaces making up such separate sets of sealing surfaces, to provide for cooling and lubrication of the surfaces and to entirely block such spaces against the leakage of gas therethrough. The control of the supply of such liquid must be automatic to insure application thereof to the set of surfaces in use at the moment. Movement of the seal must also be automatic and the control of such movement must be a result of some operation inseparably connected with the starting and stopping of the compressor to avoid improper operation of the seal or even failure thereof due to the use of the improper set of sealing surfaces for the machine conditions prevailing.

In a centrifugal compressor handling a refrigerant which is soluble in the lubricating oil used, it is desirable to separate the shaft joint seal and the lubricant reservoir and pump from the path of flow of the refrigerant through the casing and to maintain a low pressure in the spaces adjacent the seal and above the level of the oil and about the oil pump in the oil reservoir. Such separated location of the seal and the oil reservoir in lowered pressure spaces removed from the path of refrigerant flow prevents the extensive intermixture of the oil, due to natural flow into the refrigerant space, which tends to coat cooling surfaces with oil and generally reduces the efficiency of heat transfer surface. Such lowered pressure can be most conveniently maintained by connection of the seal space and oil reservoir space to the intake of the first impeller stage of the compressor and by providing such connection with means by which the pressure in such spaces is reduced even below the inlet pressure of the compressor.

Unless double impellers are used for the compressor, a thrust is developed on the shaft toward the intake end of the machine. Such a thrust must be balanced as by the use of a balance disk having one side, adjacent to the impellers, subjected to a high pressure and having the other side, away from the impellers, under low pressure. The required pressure relation can be obtained on such balanced disk if one side is subjected to the full discharge pressure of the last impeller stage and the other side is within a space connected with the intake of the first impeller space where the refrigerant pressure is the lowest in the system.

Maintenance of a low pressure, adjacent the seal and over the oil level in the oil reservoir by means of a balance disk on the shaft reduces the quantity of refrigerant dissolved in the oil under running conditions. Maintenance of such low pressure in the space adjacent the seal casing and the portion of the shaft projecting therethrough reduces the service required of the seal and prevents leakage of gas out of the compressor. Any leakage which takes place will only be leakage of air into the compressor which air can be readily purged from the refrigerant while the system is in operation.

It is therefore among the objects of the present invention to provide a centrifugal compressor in which the space adjacent the seal between the casing and the projecting portion of the compressor shaft is kept at a pressure equal to or less than the inlet pressure of the machine.

Another object of the invention is to provide a centrifugal refrigeration compressor in which the space occupied by the lubricating oil reservoir and pump is separated from the path of gas flow through the compressor and is kept at substantially the inlet pressure of the gas.

Another object of the invention is to provide a centrifugal compressor in which the thrust on the compressor shaft is balanced by a disk subjected on one side to the full discharge pressure of the compressor and on the other side is under the pressure only of the lowest pressure in the compressor.

Another object of the invention is to provide a centrifugal compressor in which the seal between the compressor casing and the portion of the shaft projecting therefrom is formed with separate sets of surfaces brought into use dependent on the then prevailing operating condition of the compressor.

Another object of the invention is to provide a centrifugal compressor in which separate sets of sealing surfaces are automatically supplied with lubricating and sealing liquid from different sources dependent on an operating condition of the compressor.

Another object of the invention is to provide a centrifugal compressor in which the seal between the relatively moving parts exposed to atmosphere, is provided with sealing surfaces movable into and out of contact with a cooperating surface when the compressor is at standstill and in operation respectively.

Another object of the invention is to provide a centrifugal compressor in which the movement of the seal between the relatively rotating parts is produced by a condition invariably occurring when the compressor is started and is stopped.

Objects and advantages other than those above set forth will be apparent from the following description when read in connection with the accompanying drawings, in which:

Fig. 1 is a vertical sectional view taken on substantially a central plane through a centrifugal compressor having the sealing and oil flow parts of the compressor separated from the gas flow paths therein and connected with points of lowest pressure in the compressor, and diagrammatically shows a seal for moving one set of sealing surfaces into and out of contact with each other dependent upon the lubricating oil pressure necessarily produced prior to starting of the compressor, and also diagrammatically illustrates the lubricating system employed for producing the lubricating oil pressure.

Fig. 2 is a vertical sectional view taken on substantially a central plane, of a valve, located as indicated in Fig. 1, for automatically controlling the flow of lubricating and sealing fluid to one surface of the seal dependent on a pressure produced when the compressor is started and to another surface of the seal dependent on a spring pressure acting when the fluid pressure ceases.

Fig. 3 is a horizontal view taken on the plane III—III of Fig. 2 to illustrate the location and form of various passageways through the support for the valve structure.

Fig. 4 is a horizontal view taken on the plane IV—IV of Fig. 2 to illustrate the location of various passageways through the valve casing and further illustrate the form of the several valves on the same stem and of the operating means for the valves; and Fig. 5 is a horizontal view taken on the plane V—V of Fig. 4 to further illustrate the form and location of the several oil passages leading into the valve structure itself and to the oil reservoir mounted above the valve.

Referring to the drawings by reference numerals, numeral 6 designates a casing in which is mounted a shaft 7, in bearings 8 and 9 formed in the casing. A plurality of impellers 11, 12, 13 are mounted on shaft 7 and are substantially separated from each other and from the inlet and discharge ports of the machine by diaphragms 16, 17 and 18 extending inwardly from the casing together with diaphragms 20, 21 and 22 extending outwardly from the shaft. Partitions 24 and 25 extend from the casing 6 toward the shaft 7 and are provided on their edges adjacent the periphery of the shaft with a plurality of flanges cooperating with flanges extending from the shaft to provide labyrinth seals 27 and 28 which retard the flow of fluid from the inlet chamber within the casing defined by the partition 24 and diaphragm 16 and from the outlet space within the casing defined by the partition 25 and the diaphragm 22. It will be seen that the impellers are connected to operate in series, that is to take gas from the inlet space and to act successively in forcing such gas through the gas flow path defined by the pairs of diaphragms 16, 20; 17, 21; 18, 22 into the outlet space of the compressor. Such successive action of the impellers produces a low pressure gas flow at considerable velocity in the inlet space and the passageways connected therewith and produces compression of the gas in three stages for discharge into the outlet space and the connecting passageways at the desired pressure.

The casing as a whole is divided into: an inlet space 29 defined by impeller 11, diaphragm 16, partition 24 and labyrinth 27, the compressing space between diaphragm 16 and 22 and containing the impellers and diaphragms 20 and 21; the discharge space, defined by diaphragm 22, labyrinths 44 and 28 and partition 25; the equalizer space 39 within partition 25, labyrinth 28 and 44 and balance disk 43; the oil reservoir space 31 between partition 25, and labyrinth 28 and the end of the casing 6, and the seal space 30 between partition 24 and labyrinth 27 and the end of casing 6 through which shaft 7 extends and to which the shaft is sealed.

The partition 24 and the labyrinth 27 substantially prevent circulation of the gas between the inlet space and the space 30 containing the bearing 8 through which the shaft 7 extends and from which the shaft extends exteriorly of the casing for connection with driving means not shown. Partition 25 and labyrinth 28 substantially prevent circulation of the gas between equalizer space 39 and the space 31 containing the bearing 9 and forming a reservoir for the lubricating oil. Shaft 7 extends through bearing 9 and is provided at its end with a worm 32 driving a worm wheel on the shaft of a lubricating pump generally indicated at 34 and extending into the oil within the reservoir. Spaces 30 and 31 are each provided with outlets connected by pipes 36 and 37 with a pipe 38 extending into the inlet space of the compressor and with its end adjacent the inlet to the first impeller stage 11 and extending in the direction of gas flow into such stage. The end of pipe 38 is therefore in the region of the highest velocity of gas flow through the compressor inlet space 29. The location and direction of the end of the pipe 38 is such as to produce an aspirating effect in the pipe by the amount of velocity of the gas passing into the impeller thus producing an even lower pressure in the spaces 30 and 31 than the pressure in the inlet space of the compressor and producing a tendency for gas and oil to flow from the inlet space 29 into seal space 30 and from equalizer space 39 into reservoir space 31. Substantial spaces about each of the outlets from the spaces 30 and 31 are enclosed by screens 40 and 41 on which any globules of liquid in suspension in the spaces 30 and 31 impinge and from which such globules are returned as large drops to spaces 30 and 31, thus preventing contamination of refrigerant in the system by lubricating oil.

A disk 43 is mounted on shaft 7 between the third stage impeller 13 and labyrinth 28 within the space defined by the diaphragm 22 and partition 25. The edge of the disk is formed with a flange 44 extending axially of the shaft 7 and is provided with rings interleaved with similar rings on the diaphragm 22 to form a labyrinth gland which allows different pressures to be maintained on the two sides of the disk. The space between the disk 43 and the back of the third stage impeller 13 is filled with gas at the full discharge pressure from the impeller 13 and the equalizer space 39 between the disk and the partition 25 is kept at a low pressure by its connection by way of a passageway in the partition and a pipe 45 with inlet space 29 near the inlet of the first stage impeller 11. The thrust on the shaft 7 which is toward the inlet end of the compressor, is therefore substantially balanced by the difference between the full discharge pressure acting on one side of the disk 43 and the suction pressure acting on the other side of the disk in the equalizer space 39.

The oil pump 34 discharges into pipe 47, which is connected with an oil reservoir in space 31 by way of a pipe containing a valve 48 for relieving any excessive pressure which might be produced, and which is connected with an oil filter 49 and oil cooler 50 from which oil flows through an outlet pipe 52 and a valve 53 into pipes 54 and 55 leading respectively to bearings 8 and 9. Oil flowing through bearing 8 is drained back to the reservoir 31 by pipes 56, 57 and 58 and oil flowing through bearing 9 drops directly into such reservoir.

The end of shaft 7 projects through casing 6 for the attachment of driving means for the compressor and forms a joint of relatively moving parts which must be sealed to prevent gas leakage therethrough in either direction. The space between the casing 6 and a flange 66 on the shaft 7 is substantially closed by a substantially cylindrical casing 67 extending outwardly from the compressor casing 6 and mounted in fluid tight relation thereon. Casing 67 is formed with a passageway 68 in the wall thereof connected with a groove 69 in the bottom of the casing to which oil may be supplied from a pipe 61 under control of a valve to be described. A ring is mounted in the bottom of the casing 67 and is formed with a plurality of cylindrical projections therefrom as at 72 to receive pistons as at 73 which act on a seal body or ring 74 having the surface adjacent flange 66 formed to a substantially plane surface for accurately seating on a similar substantially plane surface formed on the flange 66. Seal body 74 is connected in fluid tight relation with an expansible and compressible bellows 76 having one end connected in fluid tight relation with a cover 77 for the seal casing 67 and is under the action of a spring 78 compressed between the seal body 74 and the cover 77. Seal body 74 is provided with passageways 80, 81 leading respectively to the surface of the sealing body or ring adjacent the periphery of the shaft 7 and to the surface of the sealing body or ring adjacent the flange 66. Lubricant is supplied to the passages 80 and 81 by way of flexible tubes 82 and 83 either directly from the oil pressure line 61 or from a reservoir 106 mounted on the seal casing 67 and under the control of a valve indicated generally at 107.

The supply of oil to seal body 74 is controlled by the valve structure 107 of which the valves are urged in one direction by a compression spring and moved in the other direction by oil pressure acting on a piston for moving the valves in the other direction. Referring now to Figures 2, 3, 4 and 5 of the drawings, the flexible tubes 82 and 83 are connected with passageways 84 and 85 which are opened and closed by valves 87 and 88 on a common stem and guided in their movement by a guide 89 and a piston-like portion 90 on the stem mounted in a cylinder block 92 provided with peripheral grooves 93 and 94 connected with the interior of the cylinder block by apertures 96 and 97. The valves are urged in one direction by a spring 98 which is opposed by a piston 99 when oil under pressure is supplied to the piston. The oil pressure supply line 61 is connected with a passageway 101, 102 and 103 formed in the valve support and housing and is connected with a pipe 104 discharging adjacent the top of an oil reservoir 106. A connection 108 with the passageway 110 is connected with the groove 94 and apertures 97 to supply oil, when the valve 88 is open, by way of the passageway 85, tube 82 and passage 80 to the space between the sealing ring 74 and the periphery of shaft 7. A connection 109 is also made from passageway 110 connected with the passageway 102 and leading to the cylinder of piston 99 at a point below the piston.

Prior to starting and during the accelerating period for the compressor, oil pressure is produced in oil line 61 by an auxiliary pump 111 with its drive 112. When pump 111 is operating and after the main lubricating pump 34 is producing pressure in the pipe line 61, such pressure is admitted below the piston 99 to force the piston to the right, thus compressing spring 98 and opening valve 88 which permits oil to flow in the path above described. Such oil pressure also flows upwardly in the pipe 104 and fills the reservoir 106 from which excess oil overflows through a drain 113 and 114 to the interior of seal casing 67 and therefrom through a float operated valve 116, a pressure operated valve 117 and a check valve 118 to the return line 55 back to the oil reservoir 31.

During the time the compressor is operating and oil pressure is being supplied as above described, such oil pressure is also being supplied by way of a passageway 68 and 69 to the servomotor cylinder 72, thus forcing the servomotor piston 73 to the left into contact with the seal body 74. The seal body and ring are then forced toward the left against the compression of spring 78 to move the sealing surface of the seal body 74 out of contact with the sealing surface on the shaft flange 66. Sealing is then accomplished by oil under pressure supplied as above described to the space between the seal body 74 and the periphery of the shaft 7.

When no oil is available to act on the valve operating piston 99, the spring 98 forces the valve 87 open and the valve 88 is closed as shown in Fig. 2. Oil then flows from the reservoir 106 through the passageway 120 about the valve stem and through the valve 87 into the passageway 84, flexible tube 83 and the passageway 81 leading to the surface of the flange 66 and seal body 74 now in contact under the action of the spring 78. In view of the fact that such surfaces are finished as substantially plane surfaces and are pressed on each other, only a small quantity of oil can flow between such surfaces and the reservoir 106 is adequate for extended time periods.

It will be seen that the present invention provides a centrifugal compressor construction in which the gas path therethrough is defined by partitions which shut off the spaces within the compressor containing the shaft bearings and provide spaces removed from the gas path for the lubricant reservoir and pump and for the seal between the compressor casing and shaft. The pressure in such spaces is kept equal to or less than the inlet pressure of the compressor, thus reducing the contamination of refrigerant by the lubricant, promoting the separation of gas from the lubricant and return of such gas to the gas path and eliminating the possibility of gas leaking from the compressor to the atmosphere. The use of a simple balancing disk for opposing thrust on the compressor shaft is made possible by subjecting one side of the disk to full discharge pressure while the other side is at the inlet pressure in the casing, thus providing the simplest possible balancing of the thrust and a very material simplification of the compressor structure. The employment of a seal having separate sets of sealing surfaces brought into use dependent on the operating condition of the compressor secures effective sealing action under all conditions and such sealing action is greatly facilitated by the combined spring and pressure movement of the seal and of the valve controlling the flow of lubricant to the different sealing surfaces. Pressure operated movement is dependent on a condition invariably associated with the starting and stopping of a compressor, thus eliminating the possibility of improper movement of the seal or the lubricating control valve.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a centrifugal compressor, a casing, a shaft rotatably supported within said casing, partitions extending interiorly and substantially across said casing inwardly of the ends thereof and substantially sealed on said shaft, one of the spaces defined by said partitions and the ends of said casing having said shaft extending therein and the other of the spaces forming an oil reservoir, an aspirating pipe extending into and in the direction of flow of fluid through and terminating in the inlet into said casing, and pipes connecting the spaces with the first said pipe, all of said pipes cooperating to reduce the pressure in the spaces below the inlet pressure.

2. In a centrifugal compressor, a casing, a shaft rotatably supported within said casing, an impeller mounted on the shaft, partitions extending interiorly and substantially across said casing inwardly of the ends thereof and substantially sealed on said shaft, one of the spaces defined by said partitions and the ends of said casing having said shaft extending therein and the other of the spaces forming an oil reservoir, bearings within said casing for supporting said shaft, said bearings being severally located in the said spaces, an aspirating pipe extending into and in the direction of flow of fluid through the inlet into said casing and terminating adjacent the inlet into said impeller, and pipes connecting the spaces with the first said pipe, all of said pipes cooperating to reduce the pressure in the spaces below the inlet pressure.

3. In a centrifugal compressor, a casing, a shaft rotatably supported within said casing, partitions extending interiorly of and substantially across said casing inwardly of both of the ends thereof and substantially sealed on said shaft, one of the spaces defined by said partitions and the ends of said casing having said shaft extending therethrough and the other of the spaces forming a lubricating oil reservoir, bearings severally located within the said spaces and supporting said shaft, a pipe extending into the region of highest velocity in the inlet into said casing and extending in the direction of fluid flow through the inlet, and pipes connecting both the spaces with the first said pipe, all of said pipes cooperating to reduce the pressure in the spaces below the inlet pressure.

MELVIN C. SHAW.
GUSTAF L. KOLLBERG.